Oct. 17, 1950  H. J. HORN  2,526,026
VEHICLE WHEEL COVER ATTACHMENT CLIP
Filed Oct. 18, 1946
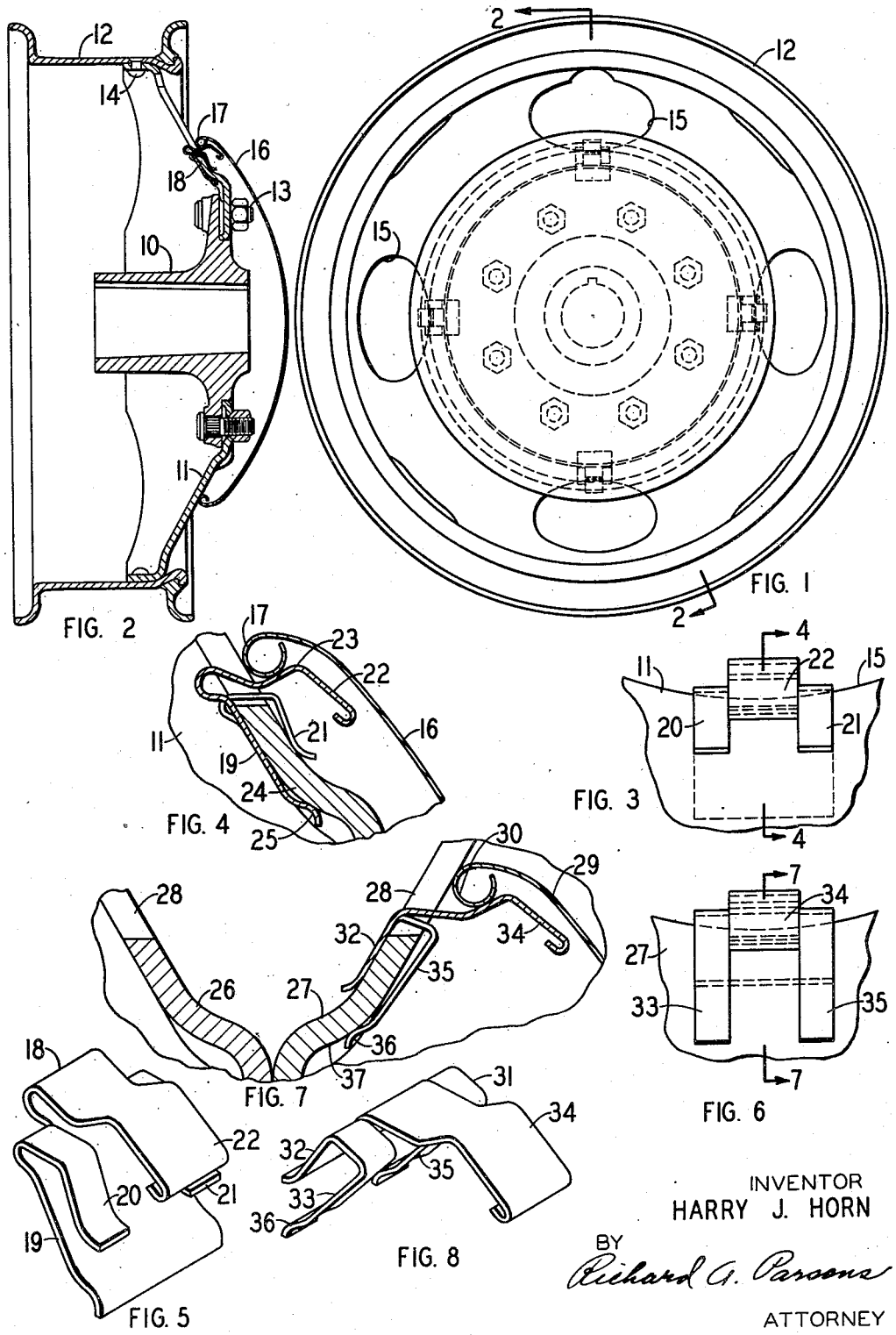
INVENTOR
HARRY J. HORN
BY
Richard A. Parsons
ATTORNEY Patented Oct. 17, 1950

2,526,026

UNITED STATES PATENT OFFICE 2,526,026

VEHICLE WHEEL COVER ATTACHMENT CLIP

Harry J. Horn, Lansing, Mich., assignor to Motor Wheel Corporation, Lansing, Mich., a corporation of Michigan Application October 18, 1946, Serial No. 703,941

6 Claims. (Cl. 301—37)

1

This invention relates to vehicle wheels, and more particularly to the means for attaching wheel covers thereto.

The principal object of the present invention is to provide a cover attaching clip for a wheel which can be attached to the wheel without modification thereof, so as to permit use of a wheel cover, or not, as the purchaser's fancy dictates.

A still further object is to provide a cover attaching clip which can be utilized to attach covers to wheels already in use but which are not provided with covers.

A still further object is to provide a clip which can be easily and rapidly attached to a wheel by frictional or snap-on engagement therewith.

These objects will more fully appear in the following specification and the accompanying drawings, wherein:

Figure 1 is an elevational view of a wheel embodying the invention;

Figure 2 is a fragmentary cross-sectional view taken on substantially the line 2—2 of Figure 1;

Figure 3 is a fragmentary elevational view on an enlarged scale of a portion of the wheel shown in Figure 1, with the cover removed;

Figure 4 is a fragmentary cross-sectional view taken on substantially the line 4—4 of Figure 3, with the cover in place;

Figure 5 is a perspective view of the clip shown in Figures 1 to 4;

Figure 6 is a fragmentary elevational view of a modified form of the invention for use with the outer of a pair of dual wheels;

Figure 7 is a fragmentary cross-sectional view taken on substantially the line 7—7 of Figure 6, with the cover in place; and Figure 8 is a perspective view of the clip shown in Figures 6 and 7.

Figures 1 to 5 illustrate one modification of the invention. It is shown in connection with a type of wheel intended especially for use on trucks. The wheel bodies of such wheels, while demountably attached to the hub, are not ordinarily equipped with covers such as are employed on private passenger vehicles, and therefore, are not provided with fixed cover attaching clips. Neither is any provision made for mounting such clips. The present invention is a form of clip which can be readily mounted on such a wheel, if a cover is desired.

The wheel shown comprises a hub 10, an annular wheel body 11 and a rim 12. The wheel body is demountably attached to the wheel hub by bolts 13 and is permanently secured to the rim by rivets 14.

The wheel body shown is provided with four relatively large openings 15, but it will be apparent that the number of openings may be either more or less than four. The openings are essentially a matter of appearance, the metal between the openings simulating spokes.

A cover 16, large enough to overlie and conceal the hub and all of the bolts 13, is provided. The cover shown is conventional, being a dish shaped member having a rolled bead 17 at its periphery.

Four cover attaching clips 18 for demountably connecting the cover 16 to the wheel are provided. The clips are all alike. Each clip is pressed from a single strip of spring metal. The clip comprises a main body portion 19 and three tongues 20, 21 and 22. The tongues are formed by slitting the original strip along parallel longitudinal lines for about half of the length of the original strip. The two laterally outer tongues 20 and 21 are bent back upon the main body 19 of the clip as shown best in Figures 3 to 5.

The tongue 22 extends angularly outwardly from the main body 19 of the clip, as shown in Figures 4 and 5. A hump 23 is formed intermediate the extremities of the tongue 22.

The clips are attached to the wheel by slipping the main body 19 and the tongues 20 and 21 over the metal of the wheel at the radially inner portions of the peripheries of the openings 15. The main body 19 and the tongues 20 and 21 of each clip resiliently grip the wheel body between them and secure the clip to the wheel. The tongue 22 extends outwardly in a position to snap under the bead 17 on the cover 16 as is conventional practice.

It will be noted that the wheel body is formed with a shoulder 24 radially outwardly of the bolt circle of the bolts 13. The main body 19 of the clip is provided with a complementary shoulder 25, which seats beneath the shoulder 24 on the wheel body. While desirable, these shoulders are not essential, as the friction between the wheel body and the main body 19 and tongues 20 and 21 of the clip are sufficient to hold the clip in place until the cover is snapped on, after which the cover entirely eliminates any possibility of removal of the clips until the cover is removed.

The cover is attached to the wheel by snapping the bead 17 over the humps 23 in the tongue 22. The tongues 22 spring radially inwardly to let the bead pass, after which the tongues resume their normal shape.

It will be noted that in the wheel shown in Figure 1 to 4 the wheel body slopes away from the bolt circle toward the inboard side of the wheel. If the wheel body slopes toward the outboard side, as in the outboard wheel of a pair of dual wheels, a slightly different form of clip is required. Such a clip is illustrated in Figures 6 to 8.

Figure 7 illustrates portions of a pair of dual wheels 26 and 27, the latter being the outboard wheel. The wheels are bolted to a hub (not shown) in a conventional manner. Both wheels are provided with openings 28 similar to openings 15. A cover 29 with a beaded rim 30 is provided also.

For detachably connecting the cover to the wheel a plurality of clips 31 are provided. Like the clips 18, the clips 31 are fastened from a strip of resilient sheet metal slit along parallel lines for about half the length of the strip. That provides a body portion 32 and three tongues 33, 34 and 35. The body portion 32 and the tongues 33 and 35 are bent into U-shape, while tongue 34 extends angularly outwardly from the clip.

Due to the fact that the wheel body 27 is reversed in position from wheel body 11, the clip 31 is shaped slightly differently than is clip 18. It will be observed that the main body portion 32 is shorter than body portion 19 and the ends of the tongues 33 and 35 are provided with shoulders 36 which cooperate with a shoulder 37 on the wheel body. Also the tongue 34 is inclined at an obtuse angle to the rest of the clip, because of the inclination of the wheel body radially outwardly of the bolt circle. Essentially, however, the two clips are similar, and operate in the same manner.

The clips shown are held on the wheel sufficiently securely to permit easy mounting and dismounting of the cover. The clips are relatively wide and engage the peripheries of the openings 15 at relatively widely spaced points at the edges of the clips, particularly where the edges of the openings 15 are curved. (See Figures 3 and 7.) This prevents rocking of the clips in the radial plane of the wheel. Once the cover has been installed the clips are even more securely fastened so that there is no possibility of accidental dislodgement of the clips in service.

It will be understood that instead of the two laterally outer tongues cooperating with the main body portion of the clip to grip the wheel body, those tongues can be formed to engage the cover, and the center tongue can be bent to grip the wheel body.

The clips are simple and easily installed on any truck wheel having spoke forming openings therein. Thus, covers can be provided as optional equipment without changing the wheel construction, or by their use covers can be added to wheels already in service.

The scope of the invention is indicated in the appended claims.

I claim:

1. A wheel comprising an annular wheel body having a plurality of angularly spaced openings therein, a dish shaped cover for a portion of said wheel, and a plurality of clips for attaching said cover to said wheel, each of said clips comprising a U-shaped portion having the base thereof located in an opening in the wheel body and the legs of the U-shaped portion frictionally gripping the wheel body adjacent the radially inner portion of the perimeter of the opening with which the clip is associated, each of said clips having means thereon frictionally engaging said cover along its inside edge to detachably connect the cover to the wheel, said cover coacting with the frictional means on said clips to lock said clips on said wheel.

2. A wheel as defined in claim 1 wherein said means comprises a resilient tongue on each clip integral therewith and extending generally axially outwardly from said wheel body.

3. A wheel comprising an annular wheel body member havng a plurality of angularly spaced openings therein, a dish shaped cover member for the central portion of said wheel, and a plurality of clips having parts thereof located in said openings along the radial inner portions of the perimeter of said openings for attaching said cover to said wheel, each of said clips comprising a body portion and three resilient tongues integral therewith, said body portion engaging said wheel body member, two of said tongues resiliently engaging one of said members and the third tongue resiliently engaging the other member, said cover coacting with the tongues it resiliently engages to lock the clips on the wheel.

4. A vehicle wheel assembly comprising an annular wheel body having a plurality of angular spaced openings therein, a dish shaped cover for a portion of said wheel, a plurality of spring clips for attaching said cover to said wheel, said clips being spaced angularly about the wheel body, each of said clips comprising a socket portion straddling the radially inner portion of the perimeter of one of said openings and frictionally engaging the opposite faces of the wheel body adjacent said perimetrical portion, each of said clips having resilient means which frictionally engage the cover along its inside edge to detachably connect the cover to the wheel, said cover coacting with said frictional means on said clips to lock said clips on said wheel body.

5. A vehicle wheel assembly comprising an annular wheel body having a plurality of angular spaced openings therein, a dish shaped cover for a portion of said wheel, a plurality of spring clips for attaching said cover to said wheel, said clips being spaced angularly about the wheel body, each of said clips comprising a body portion and a plurality of resilient tongues, at least one of said tongues being return bent from said body portion and in generally parallel relation thereto, the body and the said tongue of the clip forming a spring socket which straddles the radially inner portion of the perimeter of one of said openings and frictionally engages the opposite faces of the wheel body adjacent said perimetrical portion, each of said clips having another humped tongue extending angularly from the edge of the body portion at which the return bent tongue joins the body portion, each of said humped tongues extending generally axially of the wheel body, said cover interengaging said humped tongues to thereby lock the spring clips on the wheel body.

6. The wheel cover assembly claimed in claim 5 wherein the cover is provided with a peripheral bead which interengages the humped tongues and flexes the humped tongues radially inwardly to thereby urge the socket portions of said clips radially inwardly and lock the clips to the wheel body.

HARRY J. HORN.

REFERENCES CITED

The following references are of record in the file of this patent:

UNITED STATES PATENTS

| Number | Name | Date |
|---|---|---|
| 2,205,653 | Hunt et al. | June 25, 1940 |
| 2,368,240 | Lyon | Jan. 30, 1945 |